(12) United States Patent
Niwa

(10) Patent No.: US 6,283,854 B1
(45) Date of Patent: Sep. 4, 2001

(54) VIDEO GAME APPARATUS, VIDEO GAME METHOD AND STORAGE MEDIUM

(75) Inventor: Takayuki Niwa, Honolulu, HI (US)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/274,323

(22) Filed: Mar. 23, 1999

(51) Int. Cl.$^7$ ................................................. A63F 13/00
(52) U.S. Cl. ................................................. 463/7; 463/23
(58) Field of Search ........................... 463/7, 8, 18, 23, 463/43; 273/148 B

(56) References Cited

U.S. PATENT DOCUMENTS

| | | | |
|---|---|---|---|
| 4,270,755 | * 6/1981 | Willhide et al. | 273/313 |
| 6,132,315 | * 10/2000 | Miyamoto et al. | 463/43 |
| 6,146,277 | * 11/2000 | Ikeda | 463/43 |

OTHER PUBLICATIONS

"The Bard's Tale", copyright Electronis Arts 1987, manual written by Michael Cranford and Bing Gordon 1985.*

* cited by examiner

Primary Examiner—Joe H. Cheng
(74) Attorney, Agent, or Firm—Oblon, Spivak, McClelland, Maier & Neustadt, P.C.

(57) ABSTRACT

When a character (player character) moving in accordance with a player operation reaches a predetermined position on a map, battle processing between the player character and enemy characters is done. In such battle processing, a player can instruct the player character to escape from a battle against the enemy characters. In such a case where the player character is instructed to escape from the battle, it is determined that the instructed escape either succeeds or fails, in accordance with probabilities of success in escaping in which the probabilities are pre-stored in a manner corresponding to the number of times an instruction to escape has been given. The probability of success in escaping can vary depending on various factors, such as the difference in level values of the player character and the enemy characters or other predetermined parameter value regarding the player character.

22 Claims, 6 Drawing Sheets

| NUMBER OF TIME DIFFERENCE IN LEVEL VALUES | FIRST | SECOND | THIRD | FOURTH | FIFTH | SIXTH |
|---|---|---|---|---|---|---|
| EQUAL TO OR GREATER THAN "2" | 60% | 90% | 100% | — | — | — |
| +1 or 0 | 40% | 60% | 80% | 100% | — | — |
| −1 | 25% | 37% | 50% | 75% | 100% | — |
| EQUAL TO OR LESS THAN "−2" | 15% | 22% | 30% | 45% | 60% | 100% |

42d

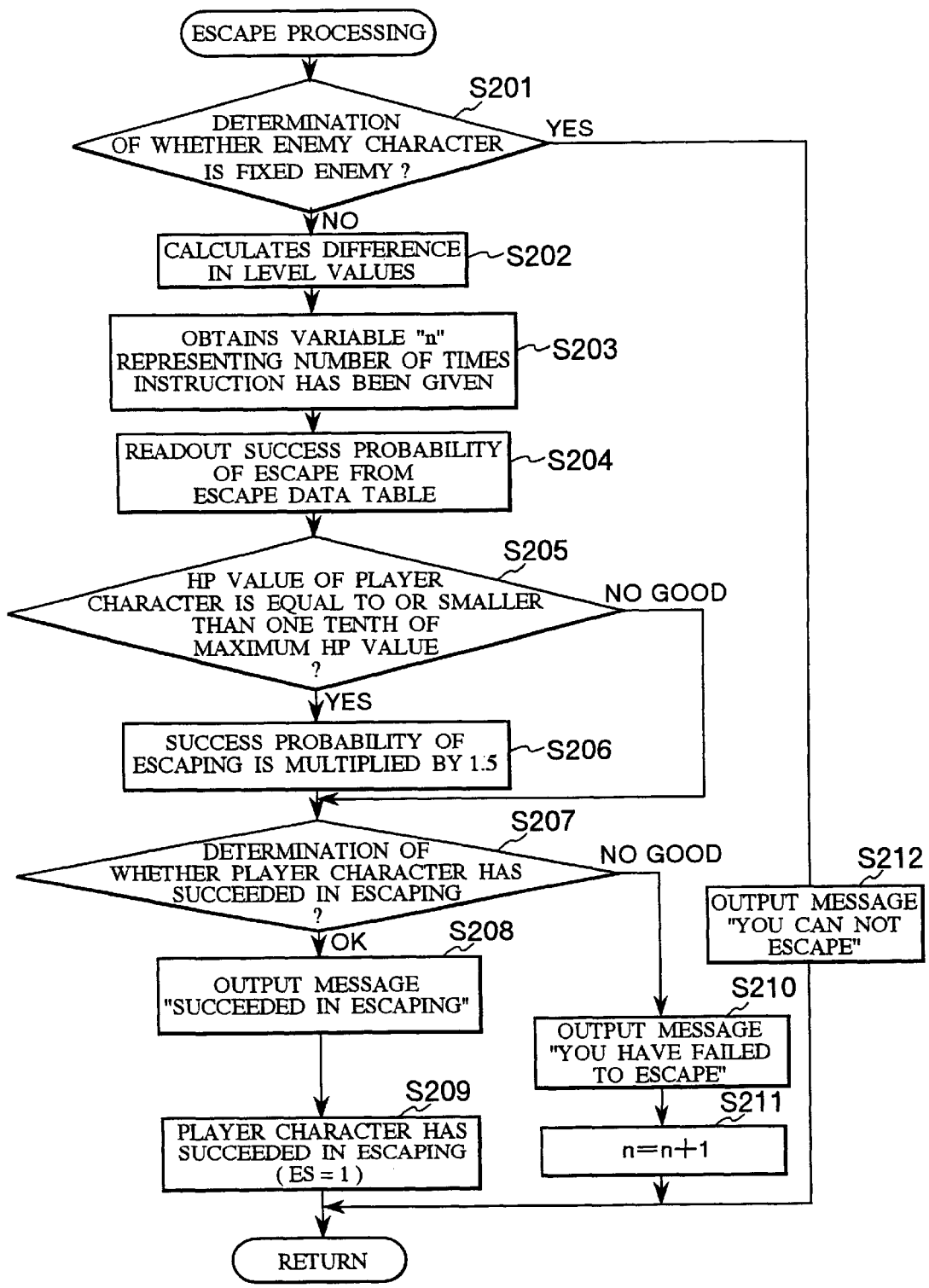

VIDEO GAME APPARATUS, VIDEO GAME METHOD AND STORAGE MEDIUM

BACKGROUND OF THE INVENTION

1. Field of the Invention

The present invention relates to a technique for controlling the probability that a character succeeds in escaping from a battle in a video game.

2. Description of the Related Art

Of video games, Role Playing Games (hereinafter referred to as RPG) are conventionally well known. In the conventional RPGs, a character (hereinafter referred to as the player character) moving on a map in accordance with player instructions encounters enemy characters, earns an experience value while battling against the encountered enemy characters, and improves in the game.

In general, it is preferred that the RPGs and other video games reproduce a scene that can be similarly recognized in the real world. That is, battle processing performed between the player character and the enemy characters is unexceptionally reproduced realistically in the RPGs. For some of these RPGs including the battle processing performed between the player character and the enemy characters, a player can control the game in order that the player character escapes from the battle against the enemy characters. Accordingly, a scene in which one escapes from a battle and that can be recognized in the real world can be reproduced in the game, that is, the virtual world.

In the actual battle situation, whether one can escape from the battle actually depends on various factors, such as a difference in the strength with oneself and the enemy, the timing in which an escape is attempted at a desired moment, and the like. However, in the conventional RPGs and the other video games, in a case where the player character is instructed to escape from the battle with the enemy characters, the probability of success in escaping has been set as a fixed value. In such a video game, whether or not the player character succeeds in escaping from the battle is determined without regard to any of various significant factors, such as the difference in the strength of oneself and the enemy, and the like, thus, resulting in reproducing an unnatural scene which can not be seen in the actual world.

In overcoming such an unnatural scene, some video games in which the probability of success in escaping can vary in a case where the player character is equipped with a predetermined item have been distributed in Japan. However, a scene in which one escapes from a battle and that can be seen in the real world can not be reproduced even in such a video game, as long as the player character is equipped with the same item all way through, since the probability of success in escaping from the battle is set as a fixed value regardless of the strength of the enemy characters.

SUMMARY OF THE INVENTION

It is an object of the present invention to provide a video game which can realistically reproduce a battle scene even in a scene of an escape from the battle.

In order to achieve the object, according to the first aspect of the present invention, there is provided a video game apparatus comprising: action instruction means for instructing an action to be performed toward an enemy character by a character which moves in accordance with an externally transmitted input in a battle against the enemy character; escape determination means for determining, in a case where the action determination means instructs the character to escape from the battle against the enemy character, whether the instructed escape will succeed or fail, in accordance with number of times an instruction to escape has been given; battle continuation means for controlling the battle between the player character and the enemy character to continue, in a case where the escape determination means determines a failure of the escape; and escape execution means for controlling the character to escape from the battle against the enemy character and for completing the battle, in a case where the escape determination means determines a success in the escape.

In the above-described video game apparatus, the escape determination means may determine whether the instructed escape will succeed or fail, in accordance with a status including various parameters set for the character and/or the enemy character.

The escape determination means may determine whether the instructed escape will succeed or fail, in accordance with, for example, a difference in level values set for the character and the enemy character.

In the case where the player character battles with a plurality of enemy characters, the escape determination means may determine whether the instructed escape will succeed or fail, in accordance with, for example, the difference in the level value set for the player character and the highest level value set from among the surviving enemy characters at that point in the battle.

The escape determination means may update the probability of determination of a success in the instructed escape, in a case where a value regarding a predetermined status set for the character is in a range of a predetermined value.

In the above-described video game apparatus, the probability that the character succeeds in escaping from the battle against the enemy characters may increase depending on the number of times the instruction to escape has been given, or the probability that the character succeeds in escaping from the battle against the enemy characters may increase depending on the difference in the level values of the battling character and the enemy character. Due to this, as in a condition which simulates the actual battle and wherein the player character can easily escape from the battle in the game, the probability of success in escaping can increase likewise in the actual world, so that the battle scene can be reproduced realistically even while the player character is escaping.

The above-described video game apparatus may further comprise enemy character determination means for determining whether the enemy character battling with the characters are "fixed" enemies which do not let the character escape from the battle. In this case, the battle continuation means may control the battle between the character and the enemy character to continue, in a case where the enemy character determination means determines that the enemy characters are "fixed" enemies.

The above-described video game apparatus may further comprise message output means for outputting a message that the escape has failed, in a case where the escape determination means determines a failure of the escape, and for outputting a message that the escape is not able to be performed, in a case where the enemy character determination means determines that the enemy characters are the "fixed" enemies.

Thus, in such a case where the character is not able to escape from the battle, the player can easily be informed from the output message as to whether the failure has resulted because the enemy characters are the "fixed" enemies, or instead because the character has simply failed in escaping.

The above-described video game apparatus may further comprise: escape succeeding probability storage means for storing the number of times the instruction to escape has been given and the probability of success in escaping, with the variables affecting each other; and escape-instructed occurrence counting means for counting the number of times in which an escape from the battle has been instructed toward the character from the action instruction means. In this case, the escape determination means may determine whether the escape instructed from the action instruction means will succeed or fail, in accordance with the probability of success in escaping which probability is stored in the escape succeeding probability storage means in a manner corresponding to the number of times the instruction to escape has been given, which number is counted by the escape-instructed occurrence counting means.

The above-described video game apparatus may further comprise: escape succeeding probability storage means for storing the number of times the instruction to escape has been given and the probability of success in escaping, in a manner corresponding to each other, for every predetermined range of a difference in the level values set for the player character and the enemy characters, in a case where there are a plurality of enemy characters; escape-instructed occurrence counting means for counting the number of times an instruction to escape from the battle has been given toward the character from the action instruction means; and level calculation means for calculating the difference in the level values set for the character and the enemy characters.

The escape determination means may determine whether the escape instructed from the action instruction means will succeed or fail, in accordance with the probability of success in escaping, for every range of difference in the level values calculated by the level calculation means, which probabilities are stored in the escape succeeding probability storage means in a manner corresponding to the number of times the instruction to escape has been given. This number is counted by the escape-instructed occurrence counting means.

In order to achieve the above-described object, according to the second aspect of the present invention, there is provided a video game apparatus comprising: an input device, a storage device, a processing device and a display device, wherein the input device inputs an action to be performed toward an enemy character by a character which moves in accordance with an externally transmitted input in a battle against the enemy character; the storage device stores a program comprising: an escape determination step of determining, in a case where the character is instructed to escape from the battle against the enemy character, whether the instructed escape will succeed or fail, in accordance with number of times in which the instruction to escape has been given; a battle continuation step of forcing the battle between the character and the enemy character to continue, in a case where the escape determination step determines a failure of the escape; an escape execution step of having the character escape from the battle against the enemy character and of completing the battle, in a case where the escape determination step determines that the escape has succeeded, wherein the processing device executes the program stored in the storage device, and the display device displays an image corresponding to the battle between the character and the enemy character and which continues in accordance with the control of the battle continuation step, and an image corresponding to the battle to be completed by the execution of the escape execution step.

In the above-described video game apparatus, the escape determination step of the program may determine whether the instructed escape will succeed or fail, in accordance with a status including various parameters set for the character and/or enemy characters.

In the above-described video game apparatus, the program stored in the storage device may further include an enemy character determination step of determining whether or not the enemy characters battling against the character are "fixed" enemies which do not let the character escape from the battle. The battle continuation step of the program may force the battle between the character and the enemy character to continue, in a case where the enemy character determination step determines that the enemy characters are "fixed" enemies.

The display device may display a message that the escape has not succeeded, in a case where the processing device determines the failure of the escape in accordance with the execution of the escape determination step of the program, and a message that the escape is not able to be performed, in a case where the processing device determines that the enemy characters are "fixed" enemies in accordance with the execution of the enemy character determination step of the program.

In order to achieve the above-described object, according to the third aspect of the present invention, there is provided an escape determination method comprising: an action instruction step of instructing an action performed to an enemy character toward a character which moves in accordance with an externally transmitted input in a battle against the enemy character; an escape determination step of determining, in a case where the character is instructed to escape from the battle against the enemy character, whether the instructed escape will succeed or not, in accordance with number of times in which an instruction to escape has been given; a battle continuation step of forcing the battle between the character and the enemy character to continue, in a case where the escape determination step determines a failure of the escape; and an escape execution step of controlling the character to escape from the battle against the enemy character and completing the battle, in a case where the escape determination step determines that the escape has succeeded.

In the above-described escape determination method, the escape determination step may determine whether the instructed escape will succeed or fail, in accordance with a status including various parameters set for the character and/or the enemy character.

The above-described escape determination step may further comprise an enemy character determination step of determining whether or not the enemy character battling against the character is a "fixed" enemy which does not let the character escape from the battle. In this case, the battle continuation step may control the battle between the character and the enemy character to continue, in a case where the enemy character determination step determines that the enemy character is the "fixed" enemy.

When the escape determination method having the above steps is executed on a machine exclusively for games or a general-purpose computer, functions and effects similarly resulted from the above-described video game apparatus can be obtained thereon.

The above-described video game apparatus can be realized by storing on a storage medium a program for executing the respective steps which the escape determination method comprises, reading the program into a computer from the storage medium and executing the same. By employing the form of the storage medium which stores the program, development, sales and distribution of the program can be produced as software medium, independently separated from being as part of a device. By installing the program in the hardware of the general-purpose computer device, the above-described video game apparatus can likewise be realized.

The program and data for realizing the steps which the escape determination method comprises may be embodied in a carrier wave, so that the program and data can be easily distributed and sold through some network.

Other advantages and meritorious features of the present invention will become more fully understood from the preferred embodiment, the claims, and the drawings which will now be explained briefly.

BRIEF DESCRIPTION OF THE DRAWINGS

FIG. 6 is a flowchart for explaining for specifically explaining escape processing described in FIG. 5.

DETAILED DESCRIPTION OF THE PREFERRED EMBODIMENT

A preferred embodiment of the present invention will now be described with reference to the accompanying drawings.

Figure 1:
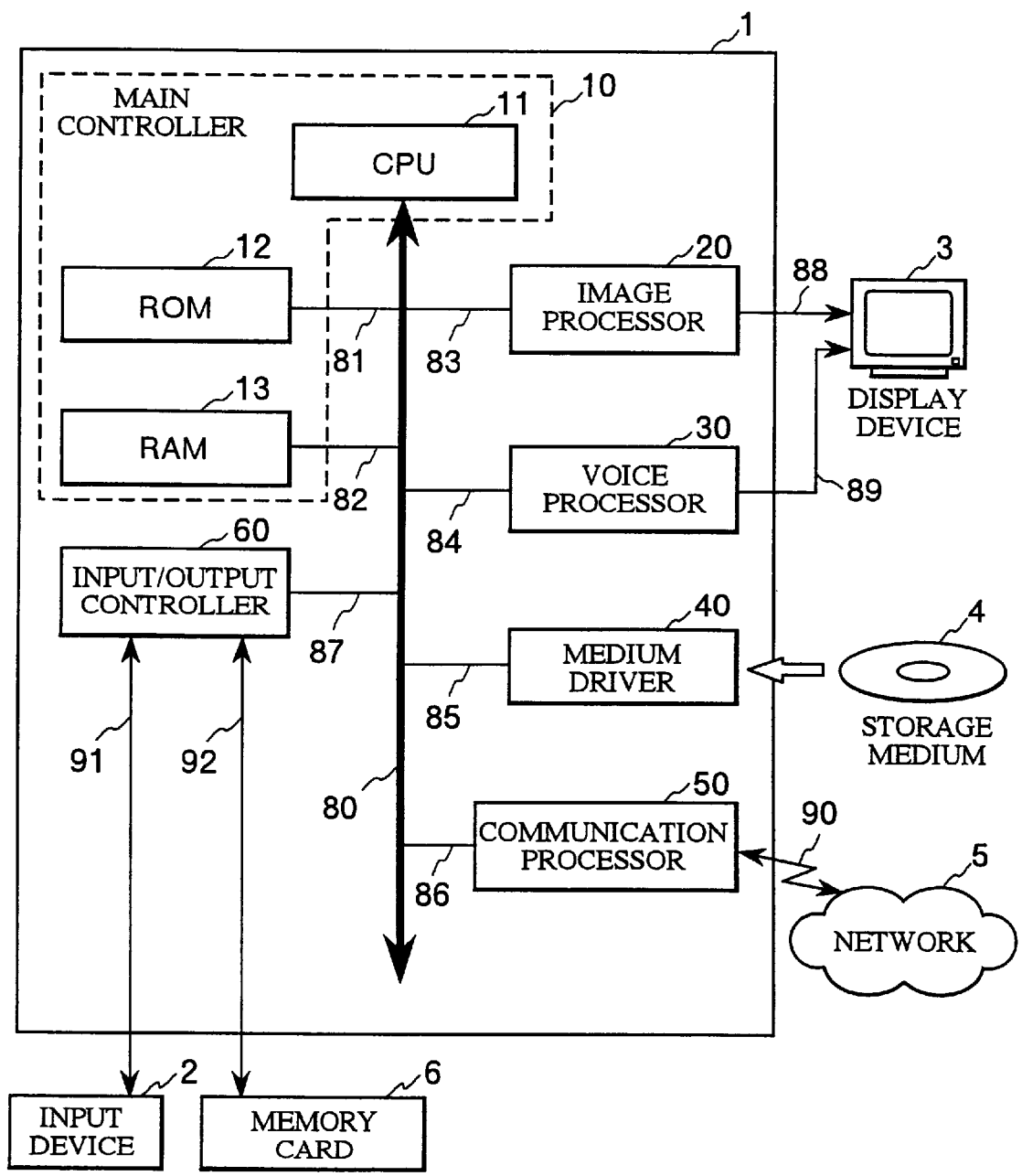
FIG. 1 is a block diagram showing the structure of a video game system according to one embodiment of the present invention.

FIG. 1 is a block diagram showing the structure of a video game system according to one embodiment of the present invention. The video game system of this embodiment comprises a video game apparatus 1 having main functions of the video game system, an input device 2 for giving input instructions to the video game apparatus 1 and a display device 3 displaying the contents of the video game executed by the video game apparatus 1, for example. A storage medium 4 which records a game program and data and which may be a CD-ROM (Compact Disc Read Only Memory) or the like is removably set in the video game apparatus 1. The video game apparatus 1 can be connected to a network 5 via a communication line 90 if necessary, and a memory card 6 for storing data regarding the progress of the game can be inserted therein.

The video game apparatus 1 reads out the game program and data stored on the storage medium 4 and executes the read out game program, by setting the storage medium 4 thereto. The detailed structure of the video game apparatus 1 will be explained later.

The input device 2 is a controller as an input interface for transmitting player instructions. The input device 2 comprises buttons for starting the video game and for giving instructions to input commands, and cross-directional keys so that a character or a cursor in the video game moves in every one of the four directions.

The display device 3 mainly has a function as an image display device which reproduces a video output signal (picture signal) 88 and a function as a voice output device which reproduces an audio output signal (voice signal) 89. In general, a television receiver having a CRT (Cathode Ray Tube) is employed as the display device 3, however, a television receiver comprising a liquid crystal display device (LCD) or a plasma display device (PD) can be used as well. The CRT, LCD or PD may be a separate display device that can be used in combination with a voice reproduction device such as an audio device or the like.

The storage medium 4 stores the game program and data for realizing the video game in this embodiment of the present invention. The data stored on the storage medium 4 will be described in more detail later. A power supply button (not shown) arranged on the video game apparatus 1 is turned on after the storage medium 4 has been inserted in the video game apparatus 1. In such a case, the video game apparatus 1 reads out the game program, program data and image data which are all stored on the storage medium 4 in order that the predetermined video game processing is executed on the basis of the read game program.

The network 5 is a communication network, such as the Internet or a commercial network connected through a communication line 90, such as a cable line or a radio wave. The memory card 6 is a means for saving data regarding to game progress which a user desires to save at various points in the game, even after the power supply to the video game apparatus 1 is turned off or the video game apparatus 1 is reset, and embodies a non-volatile semiconductor memory, such as a flash memory or the like.

The structure of the video game apparatus 1 will now specifically be described. As illustrated in FIG. 1, the video game apparatus 1 comprises a main controller 10 in charge of basic calculations, an image processor 20 in charge of image processing, a sound processor 30 in charge of voice processing, a medium driver 40 in charge of processing around the storage medium 4, a communication processor 50 in charge of communication processing performed between the external network 5 and the video game apparatus 1, and an input/output controller 60 in charge of input/output processing performed by an operating system.

The main controller 10 includes a CPU (Central Processing Unit) 11 directly connected to a bus 80, a ROM (Read Only Memory) 12 connected to the bus 80 via a signal line 81, and a RAM (Random Access Memory) 13 connected to the bus via a signal line 82. The image processor 20 is connected to the bus 80 via a signal line 83. Similarly, the sound processor 30, the medium driver 40, the communication processor 50 and the input/output controller 60 are all connected to the bus 80 via signal lines 84 to 87 respectively. Because of this, the main controller 10, the image processor 20, the sound processor 30, the medium driver 40, the communication processor 50 and the input/output controller 60 can perform data communications with one another via the bus 80.

The CPU 11 is the backbone part of the main controller 10 and is to execute a program stored in the ROM 12 and RAM 13. The ROM 12 is a non-volatile semiconductor memory storing a boot loader and the like used during the period of the start up time. The RAM 13 is a volatile semiconductor memory which stores the program executed by the CPU 11 and data required for executing the program, or which is used as a working area while the program is executed by the CPU 11. Allotment of areas to the RAM 13 and data stored therein will be explained later in more detail.

The image processor 20 is used for performing lighting calculations and for transforming coordinates at the high speed necessary for image display, that is, calculating a matrix in a fixed decimal point form or a vector by means of a parallel processing system, for example. The image processor 20 comprises a CRTC (Cathode Ray Tube Controller) function for image display and a high-speed drawing function for polygons in a frame buffer (not shown) both of which are executed in accordance with an order for polygon drawing transmitted from the CPU 11. The image processor 20 has a two-dimensional address space which is independent from the CPU 11 and wherein the frame buffer is mapped.

The sound processor 30 reproduces a voice signal at a sampling frequency of 44.1 KHz, referring to ADPCM (Adaptive Differential Pulse Code Modulation) sample data as a sound source, for example. The sound processor 30 embodies a plurality of voices so that simultaneous articulation is able to be performed. The sound processor 30 can set up, to every voice, various functions of pitch conversion, timely changes in the pitch, a noise source, envelope and volume, in addition to an on/off switch of a digital reverberator.

The medium driver 40 drives the set storage medium 4, reads out data stored on the storage medium 4 with an optical pick up, and transfers the read program and data to the main controller 10. If the CD-ROM is employed as the storage medium 4, the medium driver 40 can be a CD-ROM drive.

The communication processor 50 performs data communications with an external device connected to the network 5 and is connected to the network 5 through the communication line 90 if necessary. The input/output controller 60 is an interface for connecting the input device 2 and the memory card 6 and is connected to the input device 2 and the memory card 6 via signal lines 91 and 92 respectively.

The program and data items stored on the storage medium 4 will now be specifically described.

Figure 2:
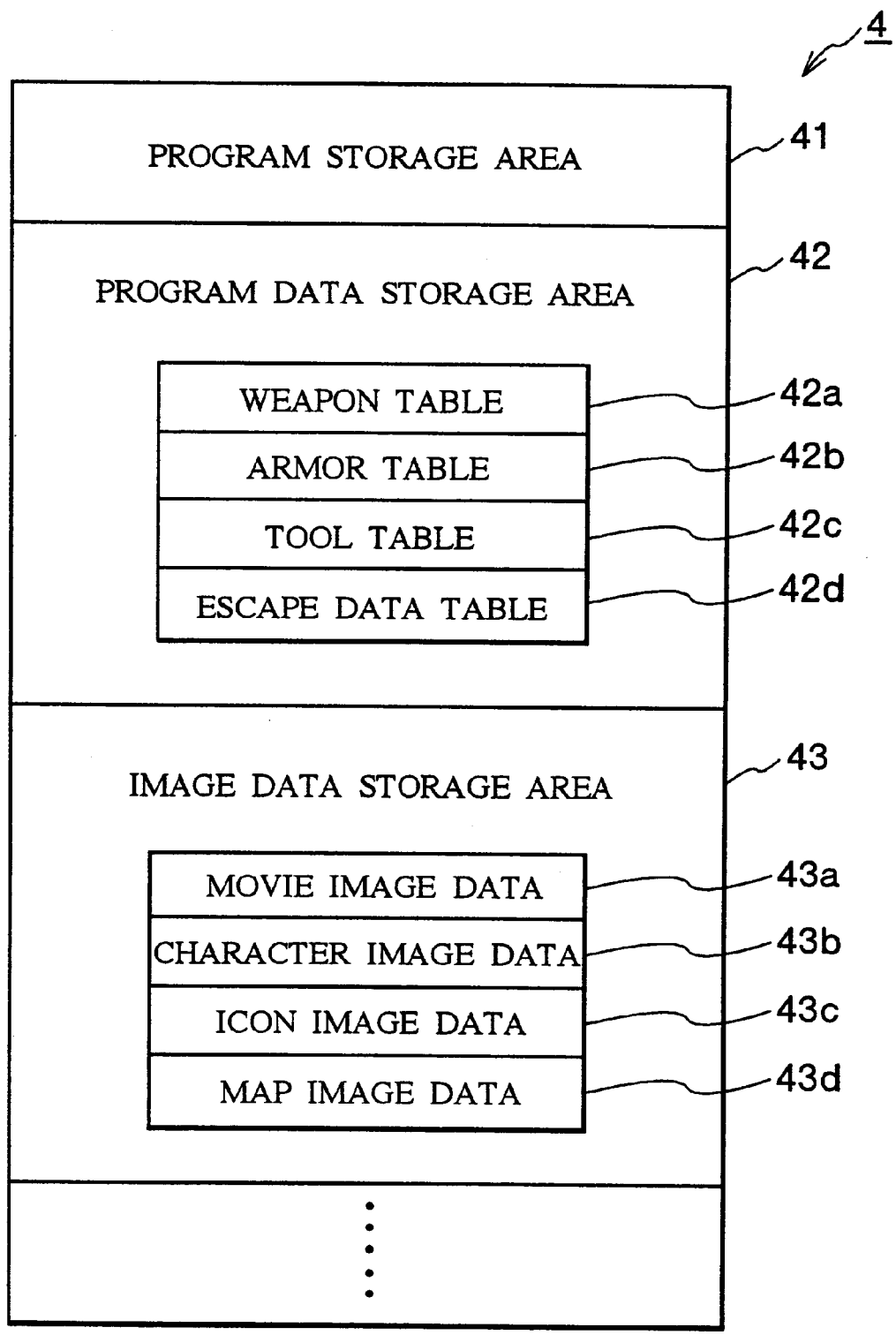
FIG. 2 is a diagram showing a program and data stored in a storage medium shown in FIG. 1.

FIG. 2 is a diagram showing the program and data items stored on the storage medium 4 and their corresponding storage areas. As shown in FIG. 2, the storage medium 4 has a program storage area 41, a program data storage area 42 and an image data storage area 43.

The program data storage area 42 is an area in which a video game program of this embodiment is stored. The program data storage area 42 stores data necessary for the progress of the game, such as a weapon table 42a, an armor table 42b, a tool table 42c, an escape data table 42d, etc.

The image data storage area 43 stores image data for displaying an image on the display device 3 during the practice of the video game. That is, the image data storage area 43 stores movie image data 43a of the "CG (Computer Graphics) movie", character image data 43b regarding to image data of a player character and an enemy character moving in accordance with an player operation, icon image data 43c used for selecting the order which is to be made by the player during the progress of the game and map image data 43d, etc., for example. The map image data 43d is image data of a map which defines a movement area of the player character, and where appearance points of the enemy character are set in several positions thereon. As the player character reaches one of the appearance points of the enemy character on the map, in accordance with an input from the input device 2, battle processing between the player character and the enemy character is performed.

Figures 3, 4:
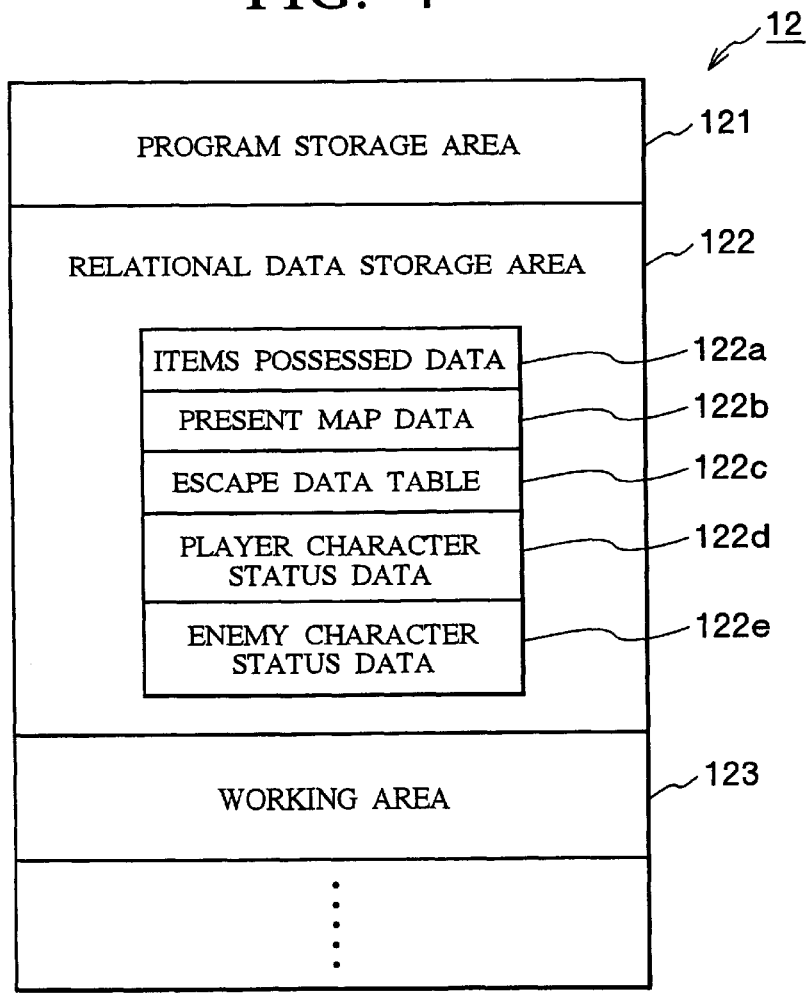
FIG. 3 is a diagram showing an escape data table.
FIG. 4 is a diagram showing areas to be allotted in a RAM in FIG. 1.

FIG. 3 is a diagram showing the escape data table in FIG. 2. A difference in level values of the player character and the enemy character and the number of times, which will be described later, in which an instruction to escape has been given are the key to a probability of success in escaping, which probability is stored in the escape data table 42d, as illustrated in FIG. 3. Assume that the difference in the currently set level values of the player character and the enemy character is equal to or greater than "+2". In such a case, the probability of success in escaping is 60% in the case of the instruction given at the first time, 90% at the second time and 100% at the third time.

Areas allotted to the RAM 13 and data stored in the RAM 13 will now be specifically explained. FIG. 4 is a diagram showing the areas allotted to the RAM 13. As illustrated, allotted to the RAM 13 are a program storage area 121, a relational data storage area 122 and a working area 123.

The program storage area 121 is an area to which a program stored in the program storage area 41 of the storage medium 4 is transmitted and stored. The CPU 11 executes the program stored in the area so as to operate a process of progressing the game. The relational data storage area 122 is to store data necessary for the progress of the game, and to store items possessed data 122a representing items (including weapons, armor and such) currently possessed by the player character, present map data 122b representing coordinates regarding the position of the player character on the map, an escape data table 122c (whose contents are the same as those of FIG. 3) transferred from the storage medium 4, player character status data 122d and enemy character status data 122e, etc.

The player character status data 122d includes parameters of the currently-set level for the player character, HP (Hit Point; remaining endurance), HP maximum value, attacking power, defensive power and mobility, and includes also flag information regarding status abnormalities such as sight defect and slow movement. The enemy character status data 122e includes parameters of the pre-set level for the enemy character, HP, HP maximum value, attacking power, defensive power, and mobility, and includes also flag information regarding status abnormalities such as sight defect and slow movement.

The working area 123 is used as a working area when the CPU 11 executes the program stored in the program storage area 121, and temporarily stores a variable "n", which will be described later, representing the number of escape instructing times and a flag variable ES, which will be described later, showing in the form of a flag whether the escape has succeeded.

Under the control of the CPU 11, the program and data stored on the storage medium 4 shown in FIGS. 2 and 3 are read from the storage medium 4 by the medium driver 40 if necessary, and are each transferred to a predetermined area in the RAM 13 via the bus 80.

Operations of the video game system according to this embodiment of the present invention will now be described. The player operates the input device 2 in order that the player character be able to move on the map. As the player character reaches an appearance point where the enemy characters appear and which is set on the map, battle processing between the player character and the enemy character begins.

Figure 5:
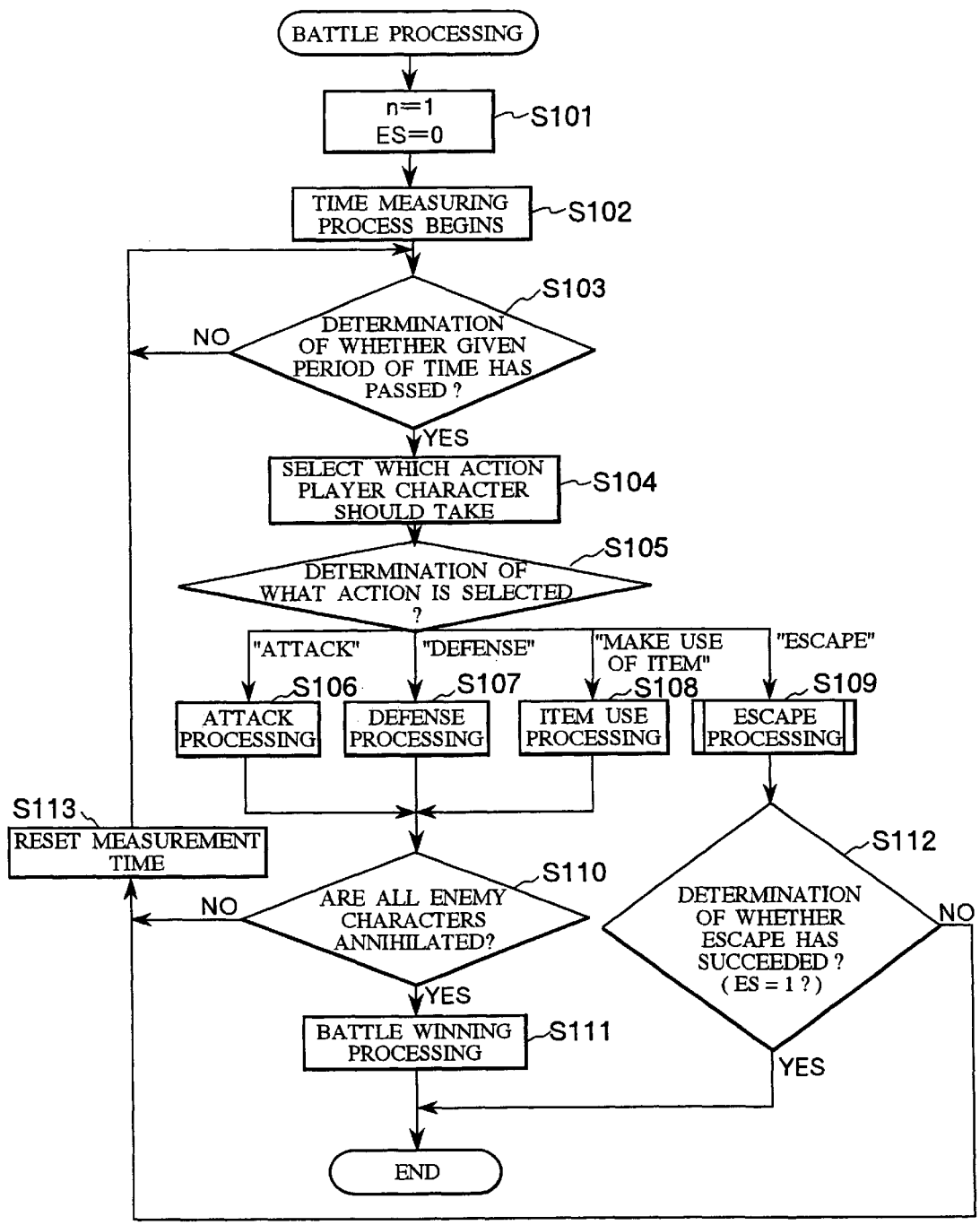
FIG. 5 is a flowchart for explaining battle processing in one embodiment of the present invention.

FIG. 5 is a flowchart for explaining the battle processing performed between the player character and the enemy character. As the battle processing begins, the variable "n" and the flag variable ES are set at the initial values "1" and "0", respectively (Step S101). After the variable "n" and the flag variable ES are set at the respective initial values, a time measuring process begins (Step S102), and the flow advances to Step S103.

In Step S103, the CPU 11 determines whether the measurement time has passed for a given period of time. This period of time can vary depending on which weapons or armor the player character is equipped with, and/or what status (including the parameters or the like) the player character has. Until the CPU 11 determines that the given period of time has lapsed, the processing of Step S103 is repeated.

In a case where it is determined that the given period of time has lapsed (Step S103; No), the player opens a predetermined menu screen by inputting through the input device 2, and selects which action the player character should take for battling with the enemy characters in accordance with the menu screen, for example (Step S104). Next, the CPU 11 determines which action has been selected (Step S105).

If the CPU 11 determines that the selected action is "attack" (Step S105; attack), predetermined attack processing is executed (Step S106). In this attack processing, the CPU 11 carries out procedures such as the calculation of a value of damage that the enemy character suffers, in accordance with a distance between the player character and the enemy character and with a weapon the player character possesses, and the subtraction of calculated value of damage from a HP value of the enemy character, and so on. The flow advances to Step S110.

If the CPU 11 determines that the selected action is "defense" (Step S105; defense), predetermined defense processing begins (Step S107). In this defense processing, the CPU 11 sets "0" to the value of damage that the player character suffers from the battle with the enemy character for a given period of time, or the CPU 11 abates the damage that the player character suffers, and the flow goes to Step S110.

If the CPU 11 determines that the selected action is "make use of an item" (Step S105; make use of an item), predetermined item use processing begins (Step S108). In this item use processing, the player selects a desired item from which the player character possesses in order that the enemy character suffers damage and that a HP value of the player character is recovered in a manner corresponding to the selected item, and the flow advances to Step S110.

In Step S110, the CPU 11 determines whether the HP value of all enemy characters is now "0", that is, whether or not all the enemy characters are annihilated or not, as a result of Steps S106, S107, S108. If the CPU 11 determines that all of the enemy characters are annihilated (Step S110; Yes), it performs predetermined battle winning processing so that bonus points or items are awarded (Step S111), after which the battle processing is completed and the general processing is conducted in which the player character moves on the map in accordance with the instructions input from the input device 2.

Similarly, if the CPU 11 determines that the selected action is "escape" (Step S105; escape), escape processing which will be described later is performed (Step S109). The CPU 11 determines whether the player character succeeds in escaping from the battle against the enemy character, that is, whether the flag variable ES is "1" or not, as a result of the escape processing (Step S112).

If the CPU 11 determines that the player character has succeeded in escaping from the battle (Step S112; Yes), it terminates the battle processing, and the general processing in which the player character moves on the map in accordance with the instructions input from the input device 2 is operated. If the CPU I1 determines that all those enemy characters are not annihilated (Step S110; No) and that the player character has failed to escape from the battle (Step S112; No), the measurement time is reset so as to start the measurement again (Step S113). The flow goes back to Step S103 and the battle processing is repeated.

FIG. 6 is a flowchart for specifically explaining the escape processing of Step S109. In the escape processing, the CPU 11 determines whether or not the enemy character appeared on the map is a "fixed" enemy from which the player character can not escape (Step S201). If the enemy character is a "fixed" enemy (Step S201; Yes), the CPU 11 and the image processor 20 both of which are operated co-operatively perform processing for displaying on the display device 3 a message "You can not escape!" (Step S212). The flow goes back to the processing shown in FIG. 5.

If the enemy character is not a "fixed" enemy (Step S201; No), the CPU 11 calculates a difference between the current level value of the player character set in the player character status data 122$d$ and the highest level value among the surviving enemy characters which have appeared on the map and have the remaining HP value (Step S202).

The CPU 11 obtains a variable "n" representing the number of times in which an instruction to escape has been given since the battle processing started (Step S203). The CPU 11 then reads out the probability of success in escaping which is stored in the escape data table 42$d$ in a manner corresponding to the obtained variable "n" (Step S204).

The CPU 11 determines whether or not the current HP value of the player character which is included in the player character status data 122$d$ is equal to or smaller than one tenth of the maximum HP value (Step S205). If the current HP value of the player character is greater than one tenth of the maximum HP value (Step S205; No), then the probability of success in escaping which has been read out in Step S204 is set as an escape probability, and the flow advances to Step S207. Conversely, if the current HP value of the player character is equal to or smaller than one tenth of the maximum HP value (Step S205; Yes), then the probability of success in escaping which has been read out in Step S204 and multiplied by 1.5 is set as the probability of success in escaping, and the flow advances to Step S207.

In Step S207, for example, the CPU 11 compares a random number generated by the execution of a random function with the probability of success in escaping, thereby determining whether the player character has succeeded in escaping from the battle as instructed in Step S104 through the input device 2 (Step S207).

If the CPU 11 determines that the player character has succeeded in escaping from the battle (Step S207; OK), the CPU 11 and the image processor 20 both of which are operated cooperatively with each other perform displaying on the display device 3 a message "Succeeded in escaping" (Step S208). Further, the flag variable ES is set at a value "1" representing the success of escape (Step S209), and the flow goes back to the flowchart in FIG. 5.

On the contrary, the CPU 11 determines that the player character has failed to escape from the battle (Step S207; No Good), the CPU 11 and the image processor 20 both of which are operated co-operatively with each other perform displaying on the display device 3 a message "You have failed to escape" (Step S210). Further, a value of the variable "n" representing the number of times the instruction to escape has been given is incremented by 1 (Step S211), and the flow goes back to the flowchart shown in FIG. 5.

Consequently, as for the condition of the game which progresses as described above, the corresponding image data is prepared by the CPU 11 and the image processor 20, both of which are operated co-operatively, and is displayed to the display device 3 as an image by being output on the display device 3 as a picture signal. The player can determine which one of instructions is to be given next to the player character, based on the image, and the game will progress by inputting a predetermined instruction from the input device 2.

Figure 7A:
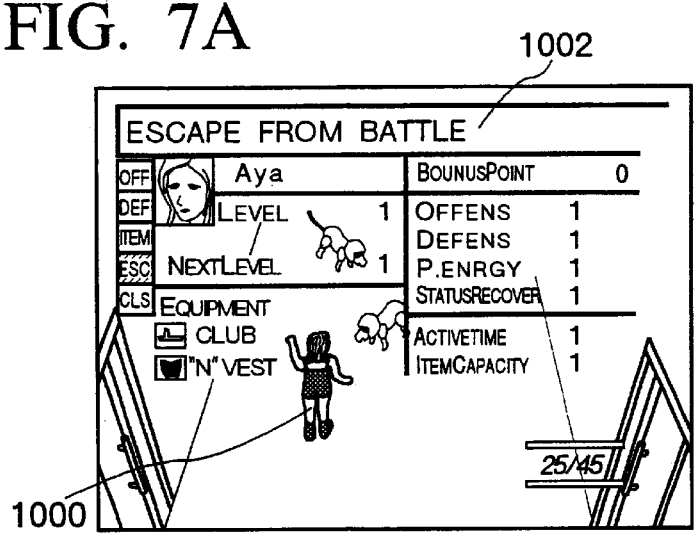
FIGS. 7A to 7C are diagrams each exemplifying progress of the game in one embodiment of the present invention.
Figure 7B:
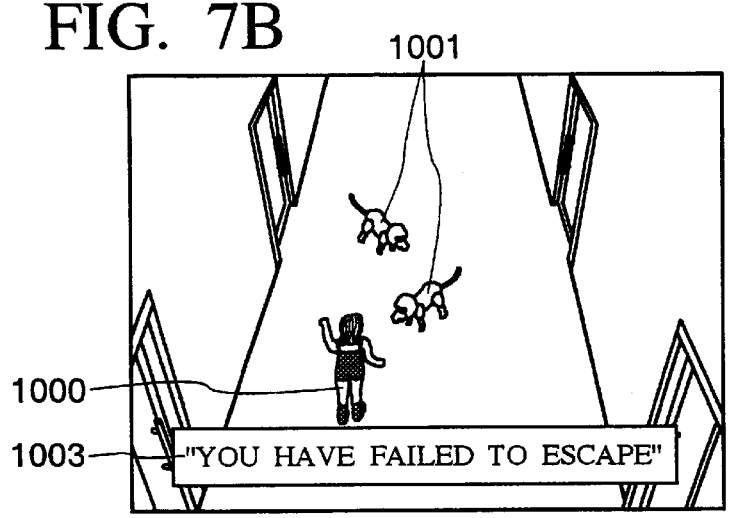
Figure 7C:

Operations of the video game system according to this embodiment of the present invention will now be described with reference to images shown in FIGS. 7A to 7C. In this embodiment, the case in which a battle is held between the player character and two identical enemy characters which are not "fixed" enemies will be explained by way of example. In this example, the level value of the player character is greater by one than that of the enemy characters, the maximum HP value of the player character is forty five and the current HP value is twenty five.

Once the battle processing begins and a given period of time has lapsed (Step S103), the player operates the input device 2 so as to open a predetermined menu screen 1002, and instructs which action the player character should take, in accordance with the menu screen (Step S104). As illustrated in FIG. 7A, assume that the player selects "escape" as an action of a player character 1000 (Step S105; escape).

Then, the escape processing (Step S109) begins, and a 40% probability of success in escaping is obtained from the escape data table 42d (Step S204), because the enemy characters are not "fixed" enemies (Step S201; No), a difference in the levels of the player character and the enemy characters is "+1" (Step S202), and the variable "n" representing the number of times in which the instruction to escape has been given is "1" (Steps S203). Since the current HP value is greater than one tenth of the maximum HP value (Step S205; No), it is determined whether the player character has escaped successfully, based on a 40% probability of success in escaping (Step S207).

Once it is determined that the player character has failed to escape on the basis of the probability of success in escaping (Step S207; No Good), a message 1003 "You have failed to escape!" is displayed on the display device 3 as shown in FIG. 7B (Step S210). Because the flag variable ES remains "0", the baffle processing in which the player character 1000 battles with the enemy character 1001 will continue (Step S112).

When the given period of times has lapsed again (Step S103), the player operates the input device 2 so as to open the predetermined menu screen 1002, and instructs which action the player character should take, in accordance with the menu screen (Step S104). As illustrated in FIG. 7A, assume that the player selects "escape" as the action of the player character 1000 as done before (Step S105; escape).

Then, the escape processing (Step S109) begins, and there is obtained a 60% probability of success in escaping from the escape data table 42d, because the enemy characters are not "fixed" enemies (Step S201; No), a difference in the levels of the player character and the enemy characters is "+1" (Step S202), and the variable "n" representing the number of times the instruction to escape has been given is now "2" (Steps S203). Since the current HP value is greater than one tenth of the maximum HP value (Step S205; No), it is determined whether or not the player character has succeeded in escaping based on the 60% probability of success in escaping (Step S207).

Once it is determined that the player character has succeeded in escaping on the basis of the probability of success in escaping (Step S207; OK), a message 1004 that "You have succeeded in escaping!" is displayed on the display device 3 as shown in FIG. 7C. Because the flag variable ES is "1", the enemy characters 1001 disappear from the map, and the battle processing is completed (Step S112).

As described above, in the escape data table 42d used in the video game according to this embodiment, the higher the level of the player character with respect to that of the enemy characters, the higher the probability of success in escaping that the player character succeeds in escaping from the battle. Therefore, according to the video game of this embodiment, the actual battle wherein it is easier to escape if the enemy is relatively weaker is realistically reproduced. By employing the video game of this embodiment, the player no longer has to go through troublesome battles against any enemy characters which do not really have much significance for the progress of the game, and whose levels are low compared to that of the player character.

The escape data table 42d of this embodiment has been set so that the larger number of times in which the instruction to escape has been given, the higher probability that the player character succeeds in escaping from the battle. Thus, as for the action of the player character, if the player selects "escape" over and over, the success probability that the player character succeeds in escaping from the battle increases, and the probability finally becomes even 100%.

If the escape is repeated over and over in the actual battle, then the condition wherein anyone can easily escape from the battle, attaining the timing to escape, can be reproduced owing to an increase in the probability of success in escaping. Having the 100% probability of success in escaping is a relief step for the player who really wants to avoid battling with any enemy characters.

Furthermore, if the remaining HP value of the player character is small, the success probability that the player character succeeds in escaping from the battle will be high. That is, the relief step can be given to the player in a circumstance where the player really desires to escape from the battle.

In the case where the player instructs the player character to escape from the battle, if it is determined that the player character has failed to escape, in accordance with the probability of success in escaping (Step S207), or if it is determined that the enemy characters are "fixed" enemies (Step S201), there is no chance for the player character to escape from the battle. It should be noted, however, that there are two different messages which may be displayed on the display device 3, that is, "You have failed to escape!" when failed in the escape and "You can not escape!" when the enemy characters are "fixed" enemies. Therefore, the player can immediately determine whether or not the player character should further attempt to escape from the battle.

In the above-described embodiment, the probability that the player character can escape from the battle with the enemy characters has been determined on the basis of the difference in the levels of the player character and the enemy character in addition to the number of times the instruction to escape has been given. However, the probability that the player character can escape from the battle with the enemy characters can be determined on the basis of the parameters representing other status of the player character and/or the enemy characters.

In the above-mentioned embodiment, when the HP value of the player character becomes equal to or less than one tenth of the maximum value, the probability that the player character can escape from the battle with the enemy characters is multiplied by 1.5. However, when the value of other parameter of the player character or the ratio of the HP value of the player character to the HP maximum value is in a predetermined range, the probability that the player character can escape from the battle with the enemy characters may vary. It is also suggested that the probability that the player character can escape from a battle with enemy characters can not only increase, but also decrease.

In the above-mentioned embodiment, when the player operates the input device 2 so as to instruct the player character to escape from the battle with the enemy characters, the probability that the escape can succeed is determined on the basis of the escape data table 42d. However, the probability that the escape can succeed can be obtained by a predetermined calculation based on the difference of the levels of the player character and the enemy characters, on the number of times in which the instruction to escape has been given or the like.

In the above-described embodiment, the present invention can be realized by employing the video game system shown in FIG. 1, as a platform. However, various types of apparatuses can be a general-purpose computer such as a personal computer, etc., a portable game machine, an arcade game machine or the like which can be employed as the platform for realizing the present invention, other than the video game system in the above-described embodiment.

In the above-described embodiment, a CD-ROM is employed as an example of the storage medium 4. However, the storage medium in the present invention can be a magnetic disc or a magnetic tape, such as an FD (Floppy Disc), an HD (Hard Disc), a DAT (Digital Audio Tape), or an optical disc such as a DVD (Digital Versatile Disc), or an optical magnetic disc such as an MO (Mageto-Optical Disc), or even a semiconductor memory such as a ROM cartridge or a flash memory, etc.

In the above-described embodiment, the program and data for realizing the video game of the present invention can be retrieved from the removable storage medium 4 which is set to the video game apparatus 1.

However, the program and data for realizing the video game of the present invention can be pre-installed in a storage device which the video game apparatus or a computer device possesses. Furthermore, the program and data for realizing the video game of the present invention can be transmitted to the video game apparatus 1, as a computer data signal which is embodied in a carrier wave and which is transmitted from an external device on the network 5 connected via the communication line 90.

In the above-described embodiment, the video game of the present invention is executed by the video game apparatus 1. However, the video game of the present invention can progress when the program is executed by a hardware resource of the external device on the network 5 connected via the communication line 90. Further, the video game can progress by performing data communications with another game machine or the general-purpose computer device via the network 5.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A video game apparatus comprising:

action instruction means for instructing an action to be performed toward at least one enemy character by a character which moves in accordance with an externally transmitted input in a battle against the enemy character;

escape instruction counting means for counting number of times an instruction to escape from the battle against the at least one enemy character has been given to said character by said action instruction means;

escape determination means for determining whether the instructed escape will succeed or fail in accordance with number of times which said escape instruction counting means is counting;

battle continuation means for controlling the battle between the character and the at least one enemy character to continue in a case where said escape determination means determines a failure of the instructed escape; and escape execution means for controlling said character to escape from the battle against the at least one enemy character and completing the battle in a case where said escape determination means determines a success in the escape.

2. The video game apparatus according to claim 1, wherein said escape determination means determines whether the instructed escape will succeed or fail further in accordance with a status including various parameters set for at least one of said character and said at least one enemy character.

3. The video game apparatus according to claim 2, wherein said escape determination means determines whether the instructed escape will succeed or fail in accordance with a difference in level values each set for said character and said at least one enemy character.

4. The video game apparatus according to claim 3, wherein:

said at least one enemy character comprises a plurality of enemy characters battling against said character; and said escape determination means determines whether the instructed escape will succeed or fail in accordance with the difference in the level value set for said character and the highest level value among the level values set for the enemy characters all of which have survived in the battle.

5. The video game apparatus according to claim 2, wherein said escape determination means updates a probability of determination of a success in the instructed escape in a case where a value regarding a predetermined status set for said character is in a range of a predetermined value.

6. The video game apparatus according to claim 2, further comprising:

escape succeeding probability storage means for storing the number of times an instruction to escape has been given and the probability of success in escaping in a manner corresponding to each other for every predetermined range of a difference in the level values set for said character and said at least one enemy character;

escape-instructed occurrence counting means for counting the number of times an escape from the battle has been instructed toward said character from said action instruction means; and level calculation means for calculating the difference in the level values set for said character and said at least one enemy character;

wherein said escape determination means determines whether the escape instructed from said action instruction means will succeed or fail in accordance with the probability of success in escaping for every range including the difference in the level values calculated by said level calculation means, said probability is stored in said escape succeeding probability storage means in a manner corresponding to the number of times the instruction to escape has been given, and said number is counted by said escape-instructed occurrence counting means.

7. The video game apparatus according to claim 1, further comprising enemy character determination means for determining whether the at least one enemy character battling with said character are fixed enemies which do not let said character escape from the battle, wherein said battle continuation means controls the battle between said character and said at least one enemy character to continue in a case where said enemy character determination means determines that said at least one enemy character comprises fixed enemies.

8. The video game apparatus according to claim 7, further comprising message output means for outputting a message that the escape has failed in a case where said escape determination means determines a failure of the escape and for outputting a message that the escape is not able to be performed in a case where said enemy character determination means determines that the at least one enemy character comprises fixed enemies.

9. The video game apparatus according to claim 1, further comprising:
   escape succeeding probability storage means for storing number of times the instruction to escape has been given and a probability of success in escaping in a manner corresponding to each other; and
   escape-instructed occurrence counting means for counting number of times in which an escape from the battle has been instructed toward said character from said action instruction means;
   wherein said escape determination means determines whether the escape instructed from said action instruction means will succeed or fail in accordance with the probability of success in escaping, said probability is stored in said escape succeeding probability storage means in a manner corresponding to the number of times the instruction to escape has been given, and said number is counted by said escape-instructed occurrence counting means.

10. A video game apparatus comprising:
    an input device configured to input an action to be performed toward at least one enemy character by a character moving in accordance with an externally transmitted input in a battle against the at least one enemy character;
    a storage device configured to store a program including an escape instruction counting step of counting number of times an instruction to escape from the battle against the at least one enemy character has been given to said character in said action instruction step, an escape determination step of determining whether the instructed escape will succeed or fail in accordance with number of times counted in said escape instruction counting step, a battle continuation step of controlling the battle between said character and the at least one enemy character to continue in a case where said escape determination step determines a failure of the escape, an escape execution step of controlling said character to escape from the battle against the at least one enemy character and completing the battle in a case where said escape determination step determines a success in the escape;
    a processing device configured to execute the program stored in said storage device; and
    a display device configured to display an image corresponding to the battle between said character and said at least one enemy character and an image corresponding to the battle to be completed by the execution of said escape execution step.

11. The video game apparatus according to claim 10, wherein said escape determination step of the program determines whether the instructed escape will succeed or fail in accordance with a status including various parameters set for at least one of said character and for said at least one enemy character.

12. The video game apparatus according to claim 10, wherein:
    the program stored in said storage device further executes an enemy character determination step of determining whether or not the at least one enemy character battling against said character comprises fixed enemies which do not let said character escape from the battle; and
    said battle continuation step of the program controls the battle between said character and said at least one enemy character to continue in a case where said enemy character determination step determines that said at least one enemy character comprises fixed enemies.

13. The video game apparatus according to claim 12, wherein said display device is configured to display a message that the escape has not succeeded in a case where said processing device determines the failure of the escape in accordance with the execution of said escape determination step of the program and a message that the escape is not able to be performed in a case where said processing device determines that the at least one enemy character comprises fixed enemies in accordance with the execution of said enemy character determination step of the program.

14. An escape determination method comprising the following steps:
    an action instruction step of instructing an action to be performed toward at least one enemy character by a character which moves in accordance with an externally transmitted input in a battle against the at least one enemy character;
    an escape instruction counting step of counting number of times an instruction to escape from the battle against the at least one enemy character has been given to said character in said action instruction step;
    an escape determination step of determining whether the instructed escape will succeed or fail in accordance with number of times counted in said escape instruction counting step;
    a battle continuation step of controlling the battle between said character and the at least one enemy character to continue in a case where said escape determination step determines a failure of the escape; and
    an escape execution step of controlling said character to escape from the battle against the at least one enemy character and completing the battle in a case where said escape determination step determines a success in the escape.

15. The escape determination method according to claim 14, wherein said escape determination step determines whether the instructed escape will succeed or fail in accordance with a status including various parameters set for at least one of said character and said at least one enemy character.

16. The escape determination method according to claim 14, further comprising an enemy character determination step of determining whether or not the at least one enemy character battling against said character is a fixed enemy which does not let said character escape from the battle, wherein said battle continuation step controls the battle between said character and said at least one enemy character to continue in a case where said enemy character determination step determines that said at least one enemy character is the fixed enemy.

17. A computer readable storage medium including a program for causing a computer to execute the following steps:

an action instruction step of instructing an action to be performed toward at least one enemy character by a character which moves in accordance with an externally transmitted input in a battle with the at least one enemy character;

an escape instruction counting step of counting number of times an instruction to escape from the battle against the at least one enemy character has been given to said character in said action instruction step;

an escape determination step of determining whether the instructed escape will succeed or fail in accordance with number of times counted in said escape instruction counting step;

a battle continuation step of controlling the battle between said character and the at least one enemy character to continue in a case where said escape determination step determines a failure of the escape; and an escape execution step of controlling said character to escape from the battle against the at least one enemy character and completing the battle in a case where said escape determination step determines a success in the escape.

18. The computer readable storage medium according to claim 17, wherein said escape determination step further determines whether the instructed escape will succeed or fail in accordance with a status including various parameters set for at least one of said character and said at least one enemy character.

19. The computer readable storage medium according to claim 17, wherein:

said program further executes an enemy character determination step of determining whether the at least one enemy character battling with said character is a fixed enemy which does not let said character escape from the battle; and said battle continuation step controls the battle between said character and said at least one enemy character to continue in a case where said enemy character determination step determines that said at least one enemy character is the fixed enemy.

20. A program signal embodied in a carrier wave, wherein a program to be provided by said program signal controls a computer to execute the following steps:

an action instruction step of instructing an action performed toward at least one enemy character by a character which moves in accordance with an externally transmitted input in a battle against the at least one enemy character;

an escape instruction counting step of counting number of times an instruction to escape from the battle against the at least one enemy character has been given to said character in said action instruction step;

an escape determination step of determining whether the instructed escape will succeed or fail in accordance with number of escape times counted in said escape instruction counting step;

a battle continuation step of controlling the battle between said character and the at least one enemy character to continue in a case where said escape determination step determines a failure of the escape; and an escape execution step of controlling said character to escape from the battle against the at least one enemy character and completing the battle in a case where said escape determination step determines a success in the escape.

21. The program signal embodied in the carrier wave according to claim 20, wherein said escape determination step further determines whether the instructed escape will succeed or fail in accordance with a status including various parameters set for at least one of said character and said at least one enemy character.

22. The program signal embodied in the carrier wave according to claim 20, wherein:

the program to be provided by said program signal further executes an enemy character determination step of determining whether the at least one enemy character battling against said character is a fixed enemy which does not let said character escape from the battle; and said battle continuation step controls the battle between said character and said at least one enemy character to continue in a case where said enemy character determination step determines that said at least one enemy character is the fixed enemy.

* * * * *